United States Patent Office 3,482,216

Patented Dec. 2, 1969

3,482,216
DATA OBLITERATING CIRCUIT OF DATA PROCESSING SYSTEM

Ernst Geissler, Bielefeld, Germany, assignor to Anker-Werke AG, Bielefeld, Germany, a corporation of Germany Filed Apr. 28, 1967, Ser. No. 634,760
Claims priority, application Germany, Apr. 30, 1966, A 52,327
Int. Cl. G11b *13/00;* G06f *1/00, 7/00*
U.S. Cl. 340—172.5 3 Claims

ABSTRACT OF THE DISCLOSURE

A data obliterating circuit is included in a data processing system which has a central processor including a shift register and a memory. The data obliterating circuit comprises a first AND gate circuit connected between the outputs of the memory and the inputs of the shift register and a second AND gate circuit connected to the outputs of the shift register and through an inverter to the first AND gate circuit. Command signals are supplied to the second AND gate circuit and the gate circuits selectively control the transfer and obliteration of data from the memory to the shift register in accordance with data stored in the shift register and the command signals.

Description of the invention

The present invention relates to a data processing system. More particularly, the invention relates to a data obliterating or masking circuit of a data processing system.

The principal object of the present invention is to provide a new and improved data obliterating circuit. The data obliterating circuit of the present invention selectively obliterates portions of data with accuracy, efficiency, effectiveness and reliability. The data obliterating circuit of the present invention also functions to provide commands and to modify commands. The data obliterating circuit of the present invention is of simple structure and low cost.

In accordance with the present invention, a data obliterating circuit is included in a data processing system having a central processor including a shift register having inputs and outputs and a memory having inputs and outputs for storing data. The data obliterating circuit comprises a control circuit connected between the outputs and inputs of the shift register for selectively controlling the transfer and obliteration of data from the memory to the shift register in accordance with data stored in the shift register. The shift register comprises a plurality of register stages in consecutive connection from a first register stage to a last register stage. The inputs are connected to the first register stage and the outputs are connected to the last register stage. The selective control of the transfer and obliteration of data from the memory to the shift register is in accordance with data stored in the last register stage of the shift register. The data stored in the memory includes different command signals. The control circuit includes means connected between the memory and the control circuit for controlling the transfer and obliteration of data from the memory to the shift register in accordance with the command signals in addition to data stored in the shift register. The control circuit comprises first gate means connected between the outputs of the memory and the inputs of the shift register and second gate means connected between the outputs of the shift register and the first gate means for controlling the operation of the first gate means. Command means supplies the command signals to the second gate means in a manner whereby the operative conditions of the second gate means is determined by data stored in the shift register and the command signals.

The first gate means comprises a plurality of AND gates each having inputs and an output. An inverter is connected in common between the second gate means and an input of each of the AND gates. The first gate means comprises a plurality of AND gates each having a first input, a second input connected to a corresponding output of the memory and an output connected to a corresponding input of the shift register. The inverter has an input connected to the second gate means and an output connected in common to the first inputs of the AND gates. The second gate means comprises an AND gate having a plurality of inputs connected to corresponding outputs of the shift register, an input connected to the command means and an output connected to the input of the inverter. The first gate means is switched to a non-conductive condition when the second gate means is switched to a conductive condition and the first gate means is switched to a conductive condition when the second gate means is switched to a non-conductive condition.

In order that the present invention may be readily carried into effect, it will now be described with reference to the accompanying drawings, wherein.

Figure 1:
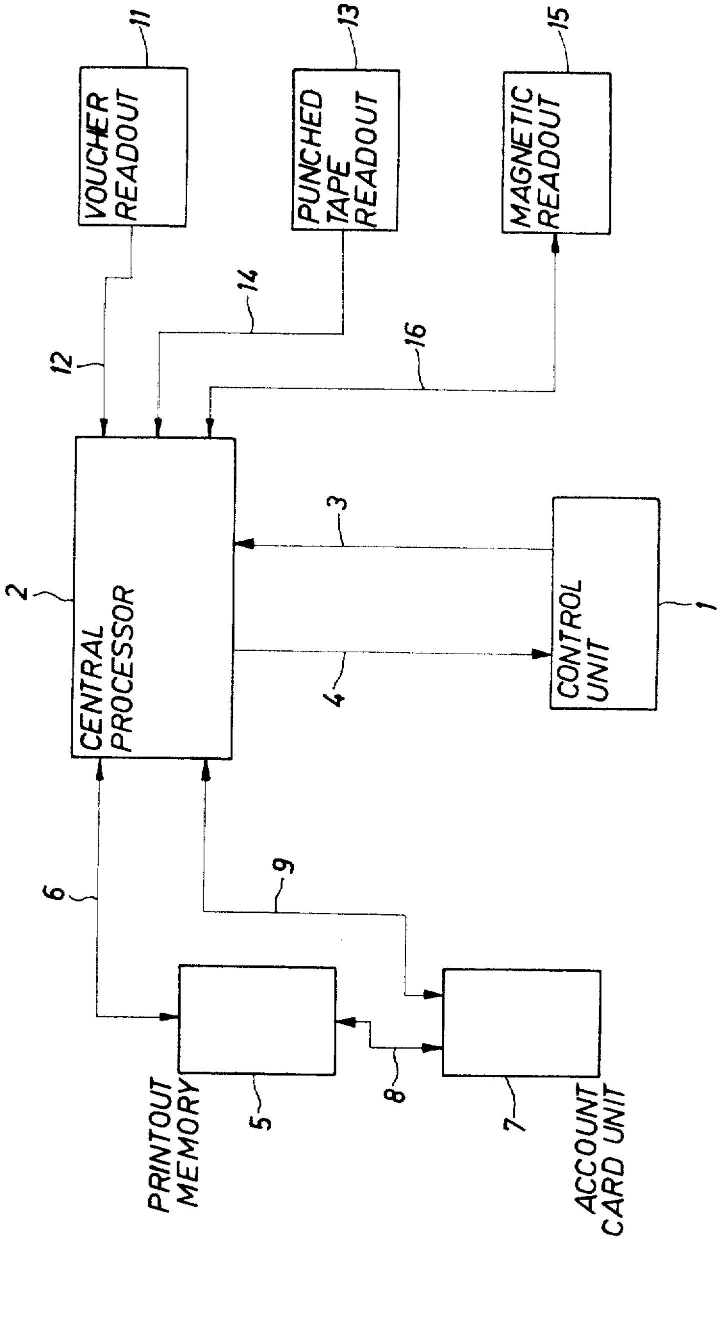
Fig.1 PRIOR ART
FIG. 1 is a block diagram of an embodiment of a data processing system of a type utilizing the data obliterating circuit of the present invention.

The data processing system of FIG. 1 comprises known components which operate in a known manner. A control unit 1 is connected to a central processor 2 via leads 3 and 4. The control unit 1 controls the computation or calculation operation in a known manner. The central processor 2 includes a computer portion, an operating portion and memory portions in known arrangement. A printout memory 5 is connected to the central processor via a lead 6. An account card unit 7 is connected to the printout memory 5 via a lead 8 and to the central processor 2 via a lead 9. A voucher readout 11 is connected to the central processor 2 via a lead 12. A punched tape readout 13 is connected to the central processor 2 via a lead 14. A magnetic readout 15 is connected to the central processor 2 via a lead 16.

The central processor 2, under the control of the control unit 1, functions as a computer to provide a desired computation operation with data from one or more of the components 11, 13, 15, 5 and 7 and provides the results of the computation at one or both of the components 5 and 7. The central processor 2 may, of course, be controlled to provide a computer operation utilizing data from the printout memory 5 and the account card unit 7 as well as data from the voucher readout 11, the punched tape readout 13 and the magnetic readout 15 and the results of the computation may also be provided at said magnetic readout as well as at said printout memory and said account card unit.

Figure 2:
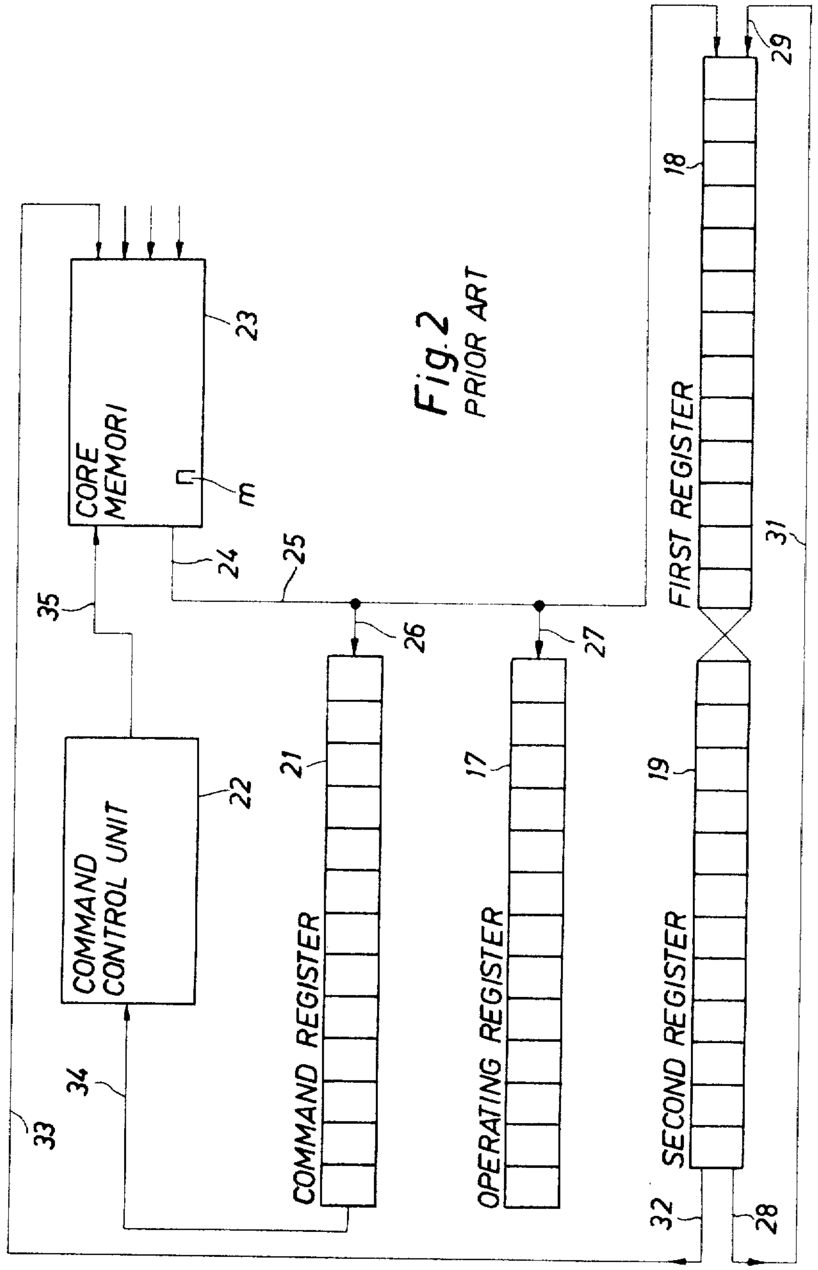
Fig. 2 PRIOR ART
FIG. 2 is a block diagram of the central processor of the data processing system of FIG. 1.

FIG. 2 discloses an arrangement which may be included in the central processor 2 of FIG. 1. The central processor arrangement of FIG. 2 comprises known components which operate in a known manner. The central processor of FIG. 2 comprises a computer portion having an operating register 17 and a storage portion comprising a first shift register 18 and a second shift register 19. The central processor of FIG. 2 also includes a command register 21 and a command control unit 22 which functions to store commands until they are completely executed. A core memory 23 is included in the central processor.

The core memory 23 may comprise any suitable memory device such as, for example, a magnetic core memory which comprises a plurality of memory cells *m* for 13 digit or position words or data and provides data recorded therein in binary form to the central processor arrangement under the control of a program. The data stored in the core memory 23 is thus provided at the output 24 thereof and is supplied to the input of the command register 21 via a lead 25 and a lead 26. The data stored in the core memory 23 is also supplied to the operating register 17 via the lead 25 and a lead 27, and is supplied to an input of the first register 18 via the lead 25.

The first and second registers 18 and 19 are interconnected so that they function together as a memory and each of said registers is a shift register. An output 28 of the second register 19 is connected to an input 29 of the first register 18 via a lead 31. An output 32 of the second register 19 is connected to an input of the core memory 23 via a lead 33. The output of the command register 21 is connected to the input of the command control unit 22 via a lead 34 and the output of said command control unit is connected to an input of the core memory 23 via a lead 35. The central processor arrangement of FIG. 2 operates in a known manner.

Figure 3A:
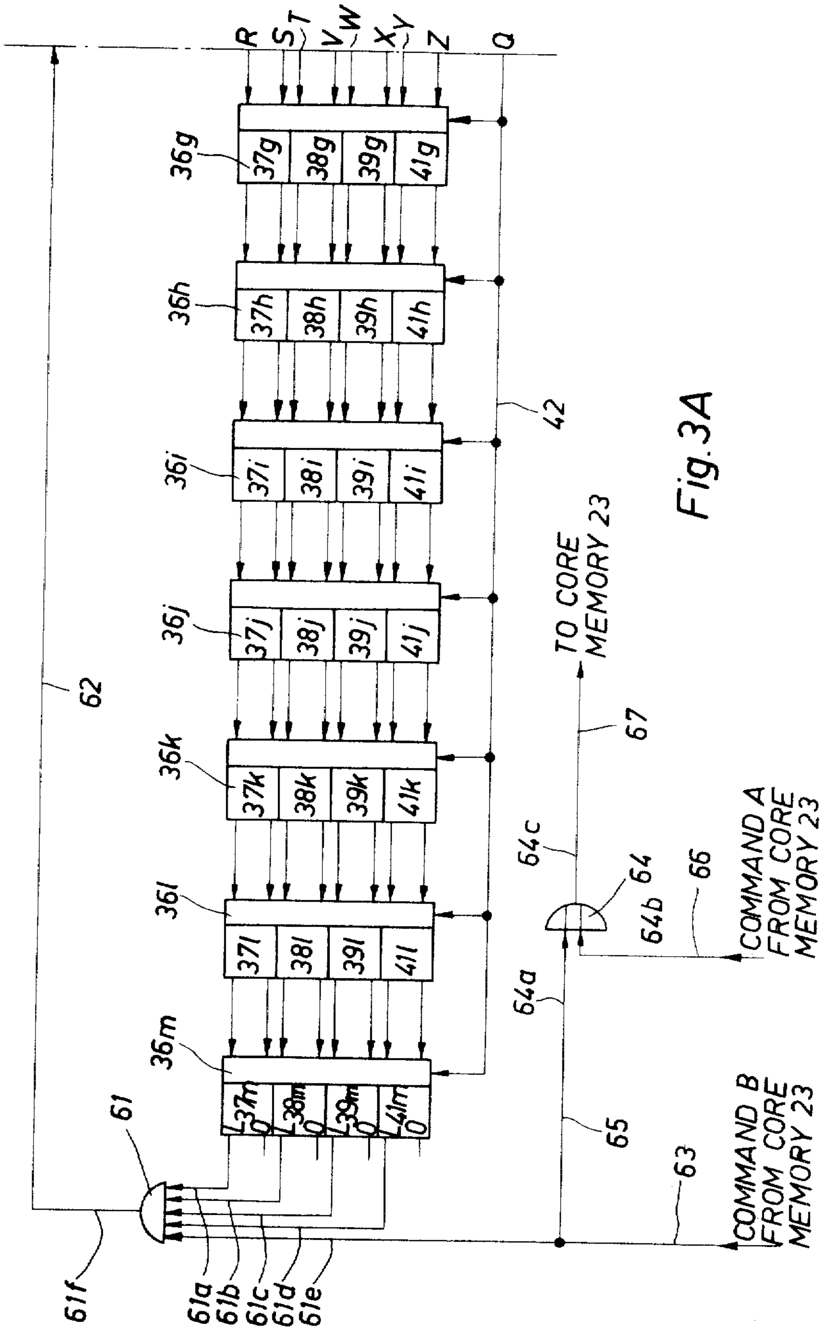
FIGS. 3A and 3B are a block diagram of an embodiment of the data obliterating circuit of the present invention.
Figure 3B:
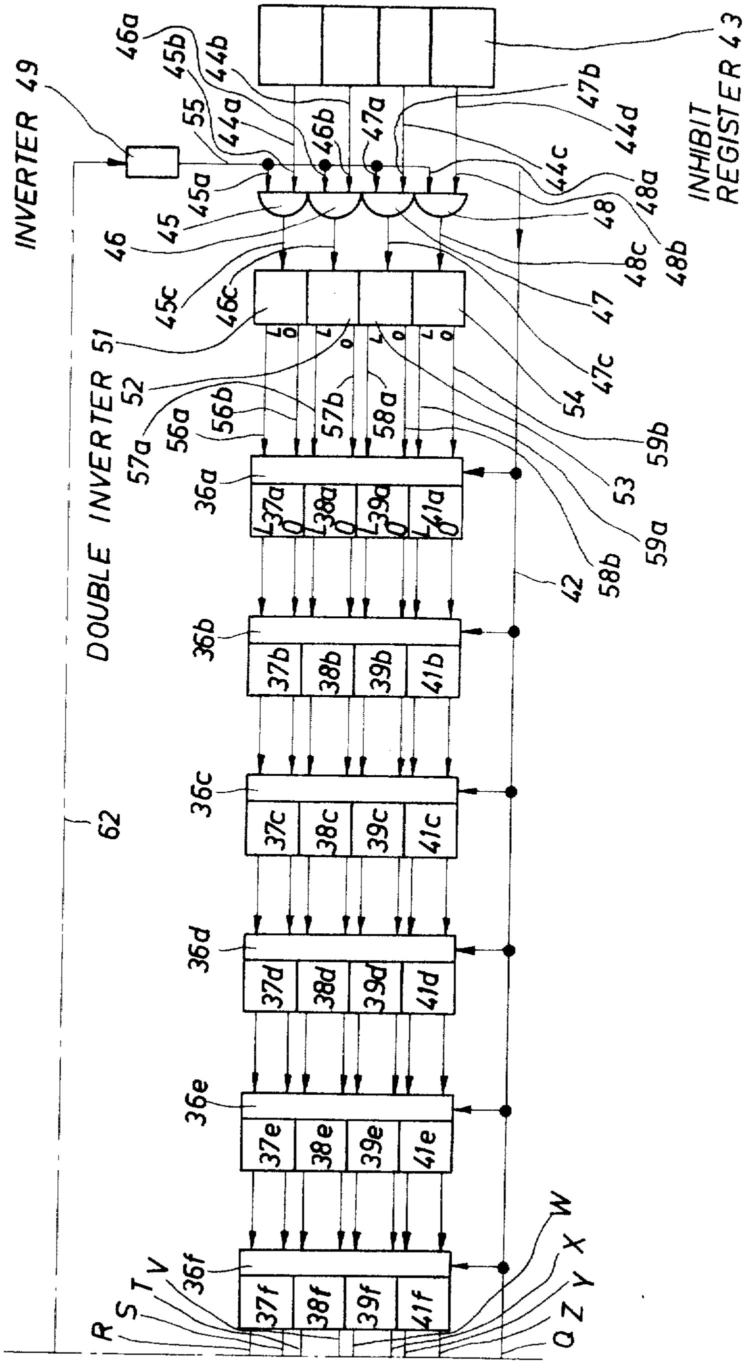

The data obliterating circuit of the present invention is utilized in the central processor arrangement of FIG. 2 and is shown in FIGS. 3A and 3B. FIGS. 3A and 3B together disclose a single embodiment of the data obliterating circuit of the present invention. FIGS. 3A and 3B show the shift register 18 of FIG. 2 in detail, said register controlling and being controlled by the data obliterating circuit of the present invention.

In FIGS. 3A and 3B, the shift register 18 comprises 13 register stages 36*a*, 36*b*, 36*c*, 36*d*, 36*e*, 36*f*, 36*g*, 36*h*, 36*i*, 36*j*, 36*k*, 36*l* and 36*m*. The register stages 36*a* to 36*m* are connected in sequence in series with each other and each of said stages comprises four bistable multivibrators or flip flops. The first register stage 36*a* comprises four flip flops 37*a*, 38*a*, 39*a* and 41*a*; the second register stage 36*b* comprises four flip flops 37*b*, 38*b*, 39*b* and 41*b*. The third register stage 36*c* comprises four flip flops 37*c*, 38*c*, 39*c* and 41*c*, and the remaining register stages each comprise four flip flops 37, 38, 39 and 41 with an additional letter affixed to the numerals of each corresponding to the letter of the register stage.

Data is shifted in the shift register of FIGS. 3A and 3B in order of alphabetical ascendancy, as indicated by the arrows on the leads interconnecting the various register stages 36*a* to 36*m*. The data is shifted under the control of shift pulses supplied to each of the register stages 36*a* to 36*m* via a lead 42 and individual leads branching from said lead to each of said register stages.

The core memory 23 of the central processor arrangement of FIG. 2 comprises an inhibit register 43 which is shown in FIG. 3B, but is not shown in FIG. 2. The inhibit register 43 comprises a plurality of outputs 44*a*, 44*b*, 44*c* and 44*d*. A plurality of AND gates 45, 46, 47 and 48 each has two inputs and an output.

A first input 45*a* of the AND gate 45 is connected to the output of an inverter 49. The inverter 49 is otherwise known as a NOT circuit and provides an output signal when no input signal is supplied to its input and provides no output signal when an input signal is supplied to its input. The second input 45*b* of the AND gate 45 is connected to the output 44*a* of the inhibit register 43. The output 45*c* of the AND gate 45 is connected to the input of a double inverter 51.

A first input 46*a* of the AND gate 46 is connected to the output of the inverter 49. A second input 46*b* of the AND gate 46 is connected to the output 44*b* of the inhibit register 43. The output 46*c* of the AND gate 46 is connected to the input of a double inverter 52. A first input 47*a* of the AND gate 47 is connected to the output of the inverter 49. A second input 47*b* of the AND gate 47 is connected to the output 44*c* of the inhibit register 43. The output 47*c* of the AND gate 47 is connected to the input of a double inverter 53.

A first input 48*a* of the AND gate 48 is connected to the output of the inverter 49. A second input 48*b* is connected to the output 44*a* of the inhibit register 43. The output 48*c* of the AND gate 48 is connected to the input of a double inverter 54. Each of the first inputs 45*a*, 46*a*, 47*a* and 48*a* of the AND gates 45, 46, 47 and 48 is connected to the output of the inverter 49 via a lead 55.

Each of the double inverters 51, 52, 53 and 54 has two outputs which are connected to the two inputs of a corresponding one of the flip flops 37*a*, 38*a*, 39*a* and 41*a* of the register stage 36*a* via leads 56*a* and 56*b*, 57*a* and 57*b*, 58*a* and 58*b*, and 59*a* and 59*b*, respectively. An AND gate 61 has a plurality of inputs 61*a*, 61*b*, 61*c*, 61*d* and 61*e* and an output 61*f* connected to the input of the inverter 49 via a lead 62. The input 61*a* of the AND gate 61 is connected to a first output of the flip flop 37*m* of the last register stage 36*m*. The second input 61*b* of the AND gate 61 is connected to an output of the second flip flop 38*m* of the last register stage 36*m*. The third input 61*c* of the AND gate 61 is connected to an output of the third flip flop 39*m* of the last register stage 36*m*. The fourth input 61*d* of the AND gate 61 is connected to an output of the fourth flip flop 41*m* of the last register stage 37*m*.

A command B is supplied from the core memory 23 of FIG. 2 to the fifth input 61*e* of the AND gate 61 via a lead 63. The command B is also supplied to a first in- output 64*c* of the OR gate is connected to an input of is supplied from the core memory 23 of FIG. 2 to the second input 64*b* of the OR gate 64 via a lead 66. The output 64*c* of the OR gate is connected to an input of the core memory 23 of FIG. 2 (not shown in FIGS. 3A and 3B) via a lead 67.

Each of the components of the data obliterating circuit of FIGS. 3A and 3B of the present invention is known and may comprise any suitable circuit or arrangement for performing the indicated function. Thus, each of the AND gates 45, 46, 47 and 48 is switched to its conductive condition when there is a signal in each of its first and second inputs. When any of these AND gates is in its conductive condition it transfers or conducts a signal from the corresponding output of the inhibit register 43 to the input of the corresponding double inverter 51, 52, 53 or 54. The AND gate 61 is switched to its conductive condition when there is a signal in each of its five inputs. Each of the foregoing AND gates is switched to its non-conductive condition, in which it blocks a signal or prevents such signal from being transmitted to its output, when there is no signal in one or more of its inputs. The OR gate 64 transmits a signal to its output if there is a signal in either of its inputs.

The AND gate 61 is switched to its conductive condition and thereby provides an output signal in its output 61*f* when a command B is supplied from the core memory 23 and the last register stage 36*m* is in its zero condition. The signal transferred to the output 61*f* of the AND gate 61 is transferred to the input of the inverter 49 via the lead 62. Thus, when the last register stage 36*m* is in its zero condition and the command B is supplied from the core memory 23, a signal is supplied to the input of the inverter 49. The inverter 49 then provides no signal in its output so that each of the AND gates 45, 46, 47 and 48 is switched to its non-conductive condition and prevents the transfer of a signal therethrough. Upon the supply of the next-following shift pulse, data stored in the inhibit register 43 is thus prevented by the AND gates 45, 46, 47 and 48 from being transferred to the double inverters 51, 52, 53 and 54, so that no data is shifted on such occasion.

If the last register stage 36*m* of the shift register is not in its zero condition, or if there is no command signal B supplied from the core memory 23, each of the inputs of the AND gate 61 does not supply a signal to said AND gate, so said AND gate is switched to its non-ductive condition. There is thus no signal in the output 61*f* of the AND gate 61 and no signal is supplied to the input of the inverter 49. The inverter 49 then provides a signal at its output, which signal is supplied via the lead 55 to the first input 45*a*, 46*a*, 47*a* and 48*a* of each of the AND gates 45, 46, 47 and 48, respectively. Thus, when data stored in the inhibit register 43 is supplied to the AND gates 45, 46, 47 and 48, said AND gates are switched to their conductive condition and transfer such data to the corresponding double inverters 51, 52, 53 and 54.

When the command A is supplied from the core memory 23, the AND gate 61 is switched to its non-conductive condition since no command B is supplied to said AND gate, so that the AND gates 45, 46, 47 and 48 are each switched to their conductive condition and transfer data from the inhibit register 43 to the double inverters 51, 52, 53 and 54.

It is thus seen that, in accordance with the present invention, upon the supply of the command A from the core memory 23, the data stored in the inhibit register 43, or more specifically, in the memory cells *m* thereof, is transmitted to the shift register 18 (FIG. 2) even if the last register stage 36*m* of said shift register is in its zero condition. Upon the command B from the core memory 23, the data stored in the inhibit register 43 is prevented from being transferred to the shift register 18 and is obliterated.

The data obliterating circuit of the present invention thus functions to obliterate selected data by preventing its transfer from the core memory 23 to the first shift register 18. The data is prevented from transfer and is obliterated upon the command B. The data is transferred from the core memory 23 to the first or shift register 18 of the data processing system by the command A.

While the invention has been described by means of a specific example and in a specific embodiment, I do not wish to be limited thereto, for obvious modifications will occur to those skilled in the art without departing from the spirit and scope of the invention.

I claim:

1. In a data processing system having a central processor including a shift register having inputs and outputs and a memory having inputs and outputs for storing data including different command signals, a data obliterating circuit comprising control means connected to said memory for controlling the transfer and obliteration of data from said memory to said shift register in accordance with said command signals in addition to data stored in said shift register, said control means comprising first gate means connected between the outputs of said memory and the inputs of said shift register, said first gate means comprising a plurality of AND gates each having a first input, a second input connected to a coresponding output of said memory and an output connected to a corresponding input of said shift register, second gate means connected between the outputs of said shift register and said first gate means for controlling the operation of said first gate means, an inverter having an input connected to said second gate means and an output connected in common to the first inputs of said AND gates, and command means for supplying said command signals to said second gate means in a manner whereby the operative condition of said second gate means is determined by data stored in said shift register and said command signals.

2. A data obliterating circuit as claimed in claim 1, wherein said second gate means comprises an AND gate having a plurality of inputs connected to corresponding outputs of said shift register, an input connected to said command means and an output connected to said first gate means.

3. A data obliterating circuit as claimed in claim 1, wherein said second gate means comprises an AND gate having a plurality of inputs connected to coresponding outputs of said shift register, an input connected to said command means and an output connected to the input of said inverter, said first gate means being switched to a non-conductive condition when said second gate means is switched to a conductive condition and said first gate means being switched to a conductive condition when said second gate means is switched to a non-conductive condition.

References Cited

UNITED STATES PATENTS

| | | | |
|---|---|---|---|
| 3,350,698 | 10/1967 | Pritchard | 340—172.5 |
| 3,343,139 | 9/1967 | Ulrich | 340—172.5 |
| 3,319,228 | 5/1967 | Apple | 340—172.5 |
| 3,213,427 | 10/1965 | Schmitt et al. | 340—172.5 |

GARETH D. SHAW, Primary Examiner